United States Patent [19]
Haagensen

[11] Patent Number: 6,104,966
[45] Date of Patent: Aug. 15, 2000

[54] PRIMAL TRACKING

[75] Inventor: Peter Haagensen, Fort Collins, Colo.

[73] Assignee: Swift and Company, Inc., Greeley, Colo.

[21] Appl. No.: 09/086,218

[22] Filed: May 28, 1998

Related U.S. Application Data

[60] Provisional application No. 60/048,021, May 28, 1997.

[51] Int. Cl.[7] .................................................. G06F 19/00
[52] U.S. Cl. ......................... 700/116; 700/115; 700/117; 221/1; 452/149; 452/166; 426/464; 426/641; 426/480
[58] Field of Search ............................. 221/1, 5, 15, 211, 221/273; 209/3.3; 700/115, 117, 116; 452/149, 150, 166; 426/641, 464, 480

[56] References Cited

U.S. PATENT DOCUMENTS

| | | | |
|---|---|---|---|
| 4,228,685 | 10/1980 | Wallace et al. | 60/649 |
| 4,256,569 | 3/1981 | Wallace | 209/3.3 |
| 4,603,610 | 8/1986 | Whitehouse | 83/13 |
| 4,662,029 | 5/1987 | Helsene et al. | 452/156 |
| 4,908,703 | 3/1990 | Jensen et al. | 348/89 |
| 4,919,950 | 4/1990 | Mak | 426/233 |
| 5,133,687 | 7/1992 | Malloy | 452/149 |
| 5,162,016 | 11/1992 | Malloy | 452/149 |
| 5,205,779 | 4/1993 | O'Brien et al. | 452/157 |
| 5,213,830 | 5/1993 | Haagensen et al. | 426/237 |
| 5,230,279 | 7/1993 | McFadden et al. | 99/334 |
| 5,241,365 | 8/1993 | Haagensen | 356/376 |
| 5,314,375 | 5/1994 | O'Brien et al. | 452/157 |
| 5,334,084 | 8/1994 | O'Brien et al. | 452/157 |
| 5,478,990 | 12/1995 | Montanari et al. | 235/375 |
| 5,595,444 | 1/1997 | Tong et al. | 374/45 |

OTHER PUBLICATIONS

Gu, "Interpretation of Mechanical Impedance Profiles for Intelligent Control of robotic Meat processing", IEEE. pp. 507–512 vol. 1, 1996.

Daley et al., "Modeling of the Natural Product Debonning processing Using Biological and Human Models", IEEE. pp. 49–54, 1999.

*Primary Examiner*—Joseph E. Palys
*Assistant Examiner*—McDieunel Marc
*Attorney, Agent, or Firm*—Sheridan Ross P.C.

[57] ABSTRACT

A method and system for tracking and identifying food products as they are being processed is disclosed, wherein no tags or encodings are attached to the food products, and wherein there is no extraneous manipulation of the food products. The tracking system of the present invention utilizes sensor input from substantially any sensor capable of detecting a food product in some manner. That is, the tracking system uses binary detect/no detect inputs for determining whether a food product can be identified at each sensor along a predetermined path. Thus, given that a food product has been identified at a particular sensor, the tracking system generates an hypothesis indicative of when the food product is expected to be at the next sensor along the predetermined path. Accordingly, if the next sensor detects a food product within an allotted window, then the food product detected is assumed to be the one to which the hypothesis applies. The tracking system is particularly useful in tracking sections of meat through a meat processing plant so that each section of meat can be associated with data identifying, the animal from which the meat section was obtained, and data indicative of meat section characteristics such as lean-to-fat ratios, color, marbling, and weight.

3 Claims, 5 Drawing Sheets

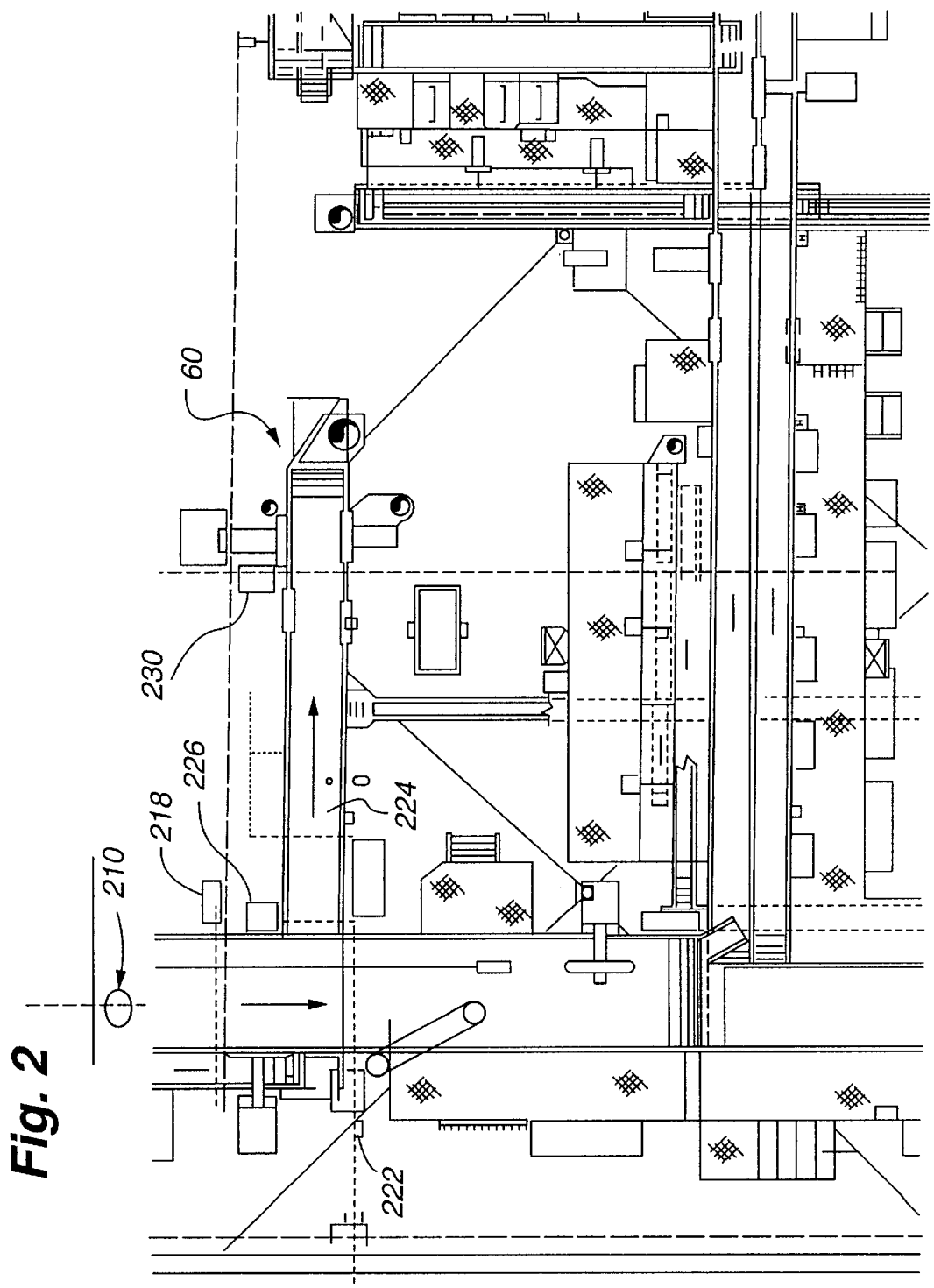

PRIMAL TRACKING

RELATED APPLICATION

This application claims priority from U.S. Provisional Patent Application No. 60/048,021, filed May 28, 1997. The entire disclosure of the provisional application is considered to be part of the disclosure of the accompanying application and is hereby incorporated by reference.

FIELD OF THE INVENTION

The present invention relates to an electronic tracking system for tracking objects along, for instance, a conveyor belt, wherein the objects may have no encodings for identification affixed to them. In particular, the present invention relates to the processing of meat wherein meat primals are tracked without labels or encodings affixed to them.

BACKGROUND OF THE INVENTION

In many manufacturing and processing applications, products or objects of various kinds are moved between workstations or processing stations by, for example, conveyors. In many circumstances it is advantageous to track each product or object along its processing path as it is conveyed by conveyor(s). This is particularly true of processes where it is desirable to maintain information regarding products as to the source of each product and/or individual components of the product as well as various characteristics of the product that may be determined during processing. In particular, such tracking has become increasingly important in the meat processing industry. That is, it has become desirable to track meat products such as primals from the packaging of such primals back to a carcass from which each primal was obtained and even further, to the lot of animals from which the carcass was obtained so that, for instance, the animal growers may be identified.

Moreover, the cutting floor of a typical meat packaging facility produces meat products representing a value of several hundred million dollars each year. The value of the meat products that are produced is dependent on the way the animal carcasses are divided into primals and on the way the primals are trimmed of fat and skin. Cutting floor operations have typically been monitored on the basis of total daily production of various primals, if the cutting floor production has been monitored at all. One of the reasons for such coarse monitoring is the difficulty in tracking meat products through various cutting and trimming operations. In particular, it has been difficult to effectively track and gather appropriate data for relating trimmed primals all the way back to the original animal carcasses and producers from which they came. Further, due to this difficulty in tracking, there has been little motivation for retaining characteristics of various meat products. That is, any measurement of a meat product, such as fat to lean ratio, color, marbling, shape, abscess, texture, if measured at all, has by necessity been immediately used for evaluating the meat product. Accordingly, the steps of gathering data regarding a particular meat characteristic and the step of using this data have typically been applied in succession to the same meat product and then the data has been discarded or disassociated from the meat product due to difficulties in maintaining an association of the data with their primals. Thus, even if it were advantageous to perform a particular action, based on the value of a particular meat characteristic, at a later time or in combination with other characteristics, such processing has typically not been available to the meat packaging industry.

Due to such inadequacies in such tracking and associating of information with meat products, carcasses and primals have been largely measured in terms of aggregate statistics such as daily production instead of finer categories such as quantity of meat of a particular color, fat/lean ratio, etc.

For example, carcass evaluation has typically been performed on the killing floor with a grading device that calculates an expected total lean content of the expected primal yields based on measurements of fat and muscle depths. Both manually operated optical probes and ultrasonic scanners are used on the killing floor for this purpose. However, the estimated expected lean contents and yields are relatively inaccurate. In fact, the estimated expected yield can be off by as much as 40%. Thus, since animal growers are compensated according to these estimates on the killing floor, substantial inaccuracy can occur in compensating and rating animal growers since the actual yields from their animals remains unknown.

SUMMARY OF THE INVENTION

The present invention provides for the tracking of primals within, for example, a meat processing plant, starting at the killing floor and tracking carcasses and primals obtained therefrom throughout the processing plant. Accordingly, the tracking system of the present invention allows data to be collected from both the killing floor and the cutting floor and combined for each carcass and primal so that data resulting from various measurements obtained during processing can be associated with the resulting primals and other meat related production statistics output by the processing plant. For example, the following data may be stored for tracking information regarding various lots of animals and shifts of workers:

(a) Hot scale weight average (by lot) and/or (by shift)

(b) Hog evaluation average (by lot) and/or (by shift)

(c) Average percent of lean meat per carcass (by lot) and/or(by shift), (d) Number of hogs processed per shift, (e) Number of records with missing weights per shift, (f) Cold scale average weight (by lot) and/or (by shift), (g) Average percent of carcass shrinkage (by lot) and/or (by shift), (h) Estimated percent lean meat per carcass using a fat measuring device on the killing floor, (i) Average hams per lot and per shift, (j) Average shoulders per lot and per shift, (k) Average ribs per lot and per shift, (l) Average loins per lot and per shift, and (m) Average bellies per lot and per shift.

Further, it is also important that various characteristics of the primals that are obtained during processing be associated with the primals during for further processing so that, for example, the characteristics of each primal can be used for cost effectively determining what additional processing of each primal is desired. For example, in processing pork, it may be desirable to have a ham visually inspected electronically at a first station as it is conveyed away from the ham/loin breakup saw so that the output from this station can be analyzed to provide indications of the color and/or the lean fat distribution of the ham. Subsequently, at a second station, it may be desirable to have the ham weighed, and at a third station other characteristics may be measured, such as the shape of the ham and/or the position of the bone within the ham. Accordingly, if such measurements can be cost effectively stored and associated with the ham throughout its processing from its breakup from the loin to final end product determination, then the meat processor obtains significant flexibility, reliability and increased quality control in the ham products produced. Accordingly, to cost effectively provide such tracking, it is desirable to reduce both manual labor and the sophistication of tracking electronic devices and associated software systems as much as possible. Further, it is also desirable that a system for tracking food products such as meat should do so without physically labeling, tagging or causing extra handling of the meat product since such procedures add additional expense as well as potential sources of contamination. Accordingly, it would be advantageous to have a simple electronic tracking system that tracks objects such as meat primals through a processing plant without any further manipulation or physical touching than is already performed within the processing plant.

The present invention commences the tracking of carcasses from the killing floor by providing radio frequency tags (transponders) that are attached to trolley sites from which the gambrels for hanging animal carcasses are provided. In one embodiment, the transponders are embedded in a metal tag attached to the trolley, wherein each tag corresponds with a gambrel. However, polymer encapsulated disk tags that mount on the surface of the trolley may also be used.

The tracking system of the present invention provides several features that increase the usefulness of the tracking system. In particular, the present tracking system provides on-line diagnostics and automatic on-line self calibration so that, for example, when anomalous events occur (e.g., a high percentage of expected meat detections are determined to be invalid), the system can alert operators, and, when minor or innocuous changes occur in meat processing, the tracking system is able to adapt to such changes. For example, if the primals on a particular conveyor form a blockage or a particular meat cutter is placing primals in problematic positions or orientations, the tracking system can alert operators of such anomalous events. Additionally, if there are minor but consistent variations in the techniques used by two meat cutters, then the tracking system can adapt to each meat cutter's pattern and thereby be better able to track primals through the processing plant.

It is a particularly important aspect of the present invention that the primal tracking system does not mark or label any meat products during the tracking operation. Instead, the tracking system generates expectation data structures or hypotheses as to where and when certain primals should be detected during processing and either confirms or invalidates such hypotheses according to detection sensors distributed along the meat processing conveyors.

Other aspects and features of the present invention will become apparent from the Detailed Description and accompanying drawings provided herein.

BRIEF DESCRIPTION OF THE FIGURES

FIG. 2 is a high level schematic of a cutting floor of a meat processing plant illustrating the positions of conveyors, cutting saws and sensors.

DETAILED DESCRIPTION

Figure 1:
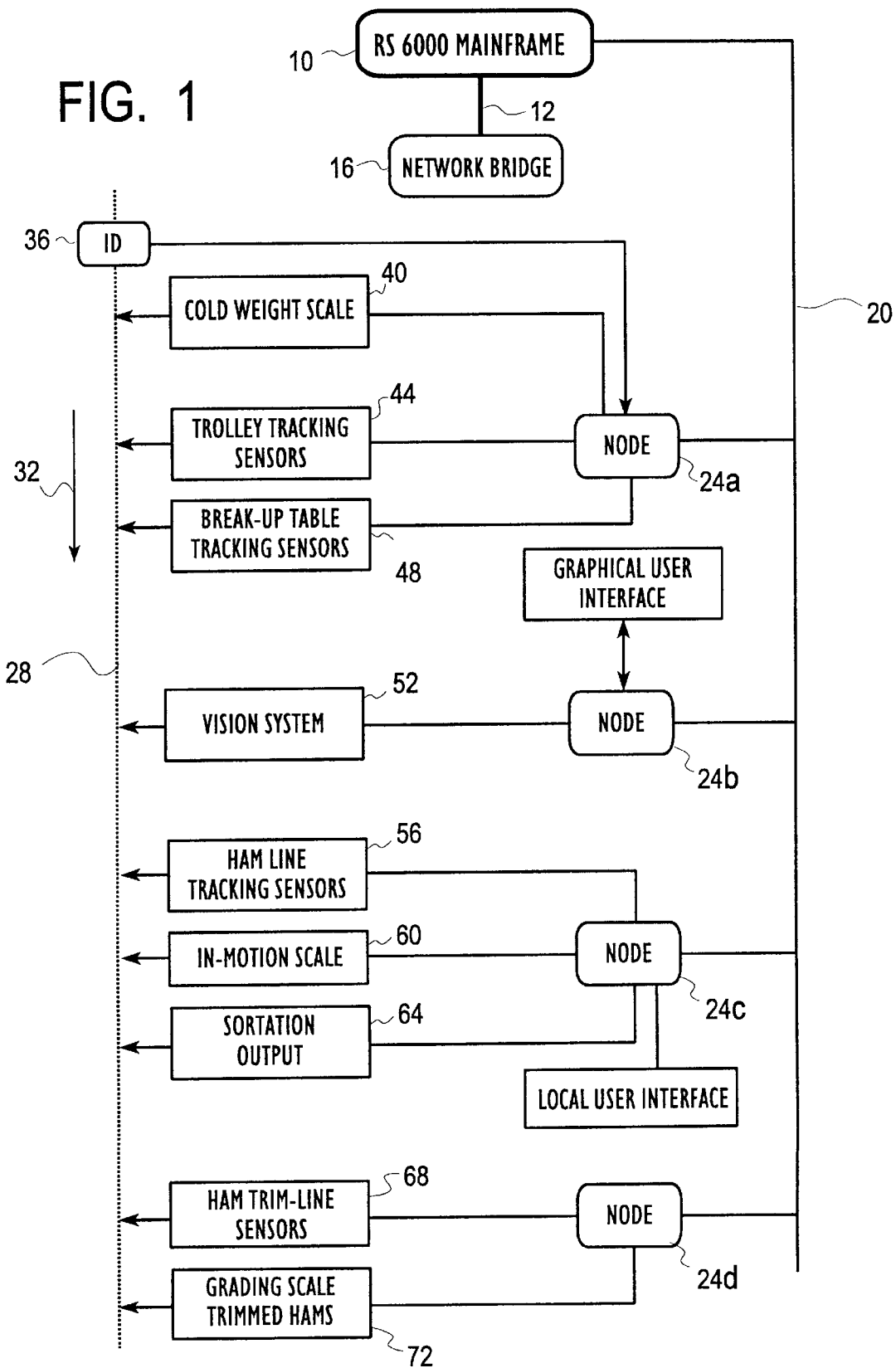
FIG. 1 is a high level schematic of an embodiment of the hardware for the present invention.

In FIG. 1, a high level schematic is provided of the present invention, wherein the high level network architecture for communication between various components of the present invention for electronic tracking and data gathering system are illustrated for meat processing. The present embodiment of the invention includes a computer 10 for processing information received from various sensors (to be described hereinbelow) and for storing and analyzing information received from the sensors so that data may be associated with each meat carcass and primal indicating its position as well as the characteristics of its meat. It is a particular aspect of the present invention that information obtained from meat cross-sections (such information being related to the color, fat/lean distribution and content, shape and size of the meat) is used by primal modeling software (not shown) executing on the computer 10 for predicting or modeling the interior of a primal. In one embodiment, the primal modeling software is based on regression analysis and correlating such information with the internal composition of a statistically significant number of hog carcasses that have been dissected for determining actual yields for various grades of meat (e.g., 100 to 200 hogs).

The computer 10 is connected to a network via an Ethernet cable 12 to the network bridge or router 16 for facilitating and managing communications on the network 20 having nodes 24a through 24d in addition to the computer 10. The meat processing path is conceptually represented by the dotted line 28, wherein conceptually the arrow 32 indicates the direction of the flow of meat primals during processing. In particular, the path 28 indicates the processing path for hams wherein initially the hams are part of hog carcasses and eventually are separated, sorted, and graded individually. The block labeled 36 is representative of the site where processing and evaluation of hog carcasses immediately after slaughter occurs. Furthermore, this block is where an identification encoding is associated with each carcass so that all primals derived therefrom can be tracked. In particular, the results of manual evaluations and the weighing of the carcasses (to obtain the "hot weight" of the carcasses immediately after slaughter) are entered into the electronic tracking system of the present invention via network node 24a and network 20 for thereby storing such information in peripheral storage 22 accessible by the computer 10. Note that it is an aspect of the present invention that each hog carcass is provided on a gambrel of a trolley (not shown) and each trolley gambrel has a unique encoded identification. In one embodiment, such identifications are stored and transmitted by radio transponders associated with each gambrel. Accordingly, such a carcass identification system allows for the association of data obtained from various measurements of each carcass with the identification of the carcass. Thus, in particular, the results from the manual evaluations and hot weighing can be associated with the carcass identification.

Typically, when the carcasses leave the initial evaluation station 36, the hog carcasses are stored in a freezer (not shown) while still on the trolley. It is a further aspect of the present invention that the carcasses may be sorted in the freezer according to the information currently known about each hog carcass. In particular, such carcasses may be sorted by size, the animal lot and/or grower from which the animal came. Subsequently, while still hanging from their assigned gambrel on the trolley, each carcass is provided to a cold weight scale 40 for determining, for example, the amount of shrinkage in the carcass that has occurred since the hot scale weighing. Note that the cold scale weight is also provided to the computer 10 via network node 24a. Following the cold weight scale 40, the hog carcasses are queued up on the trolley for dispatching to the cutting floor (illustrated in FIG.

2) for decomposing the carcasses into their various primals. Prior to the removal of a carcass from the trolley for further decomposition, the transponder associated with the carcass is activated to output the identity or encoding of the carcass, wherein this identifying information is communicated to the computer 10 via the trolley tracking sensors 44 and the network 20. Subsequently, when the hog carcasses are delivered to the cutting floor 46, or more precisely, to the main breakup table or conveyor 204 (FIG. 2), low cost tracking sensors, collectively denoted as break-up table tracking sensors 48, such as photo eyes 210, 218, 226 and 230 (FIG. 2) are used for tracking the hog carcasses and their primal byproducts such sensors 48 have substantially binary output (i.e., output indicating an object is detected or an object is not detected). Moreover, as shown in FIG. 1, the output from the tracking sensors 48 is also provided to the computer 10 via the network 20.

Following the sensors 48, once the ham is separated from the carcass, a vision system 52, having color vision station 222 (FIG. 2), is employed to scan a cross section of the cut surface of the carcass for determining certain characteristics of the internal consistency of the ham, and the loin from which the ham was separated. Note that the vision system 52 may provide the computer 10 with input relating to meat characteristics such as the color of the meat, the amounts of lean and fat, and/or the distribution of lean and fat across the newly exposed cut surface.

The present invention uses such measurements for categorizing primals according to a color indexing scheme such as the well-known scale having values from 1 to 6 that is used extensively in Japan, wherein 1 is very pale meat and 6 is very dark meat. Further, the color vision system of the present invention may be used for detecting pale, soft and exodative meat (PSE) as well as dark, firm and dry meat (DFD), wherein meat having a color corresponding to these categories is considered less desirable. Moreover, the color vision system of the present invention provides data for determining a leanness index that can be used to both grade primals and determine which primals are suitable for deboning (that is, the higher quality primals), or the primals to be sold without extensive further processing (that is, the lower quality primals).

In one embodiment of the vision system 52, meat quality parameters such as marbling, fat and lean distribution, dimensions and shape of a primal are determined. Moreover, the vision system 52 may be provided with additional photo sensors (not shown) that scan other cross-sectional cuts of primals, such as a cut between the shoulder and the loin. Thus, the computer 10 can use data received from the vision system 52 for grading or evaluating various primals according to the analysis performed by the computer 10 on the data obtained from cross-sections of the primals exposed by the cutting operations. In one such embodiment, a color vision sensing station of the vision system 52 is positioned so that it views one of the cut cross-sections using a light shield on top of and to the side of the conveyor upon which the primals are conveyed. Note that such a color vision station for the loin/shoulder break-up cut can be located before the loin/belly split (as one skilled in the art will understand) so that a measurement of meat color from the loin/shoulder break-up cut can be used to determine an estimated lean meat content of the loin, belly and shoulder.

Further, the lean content estimation, using for example, the output from the color system 52, requires a calibration step for determining the accuracy or the significance that can be given to a detected color characteristic. In one embodiment, such a calibration step involves performing a multivariate statistical analysis such as a principal component decomposition, wherein primals from 100 to 200 animals have one or more color characteristics and are subsequently deboned and fully dissected to determine the actual lean meat content so that regression coefficients may be determined.

Further, the cameras (not shown) included in each vision station are provided within a watertight stainless steel enclosure and the station is capable of processing approximately 60 frames per second while hams are moving by. Additionally, the software for executing on computer 10 and associated with the vision system 52 produces a color quality score from samples of 30 to 50 points on each cross-section viewed by the vision station. In addition, note that this software also may provide both graphical and textual information regarding statistical color measures of each lot of primals from a given animal producer. In particular, standard deviations from a computed mean color quality score are stored in this regard. In one embodiment of the above-mentioned software associated with the vision system 52, the following steps are performed after the computer 10 receives input data from scanning the ham/loin split cross-section:

a. the data is identified with the identification fields for the half carcass;

b. using the data, a color category is determined for this cross-sectional surface and a marbling score is also determined;

c. using the color and marbling score, a prediction is derived as to the yield of the ham; and d. all such derived data is added to the hog carcass record associated with the half carcass from which the ham was cut.

Further note that depending on the embodiment, either the ham side of the cut between the ham and the loin or the loin side can be scanned by the ham vision system 52. Additionally, note that in one embodiment, the vision station 222 of the vision system 52 occurs immediately after the separating of the ham from the loin and subsequently the ham is routed to a different conveyor (conveyor 224 of FIG. 2).

Following the vision system 52, or more precisely the vision station 222 (and assuming that the hams travel along a conveyor to designated ham processing stations), low cost photo eyes 226 and 230 (FIG. 2) are provided along the conveyor belt for detecting the hams as they are conveyed through the ham processing stations. Such photo eyes are denoted collectively in FIG. 1 as ham line tracking sensors 56. Note that such photo eyes may be substantially identical to the trolley tracking sensors 44 used for tracking carcasses on the trolley. Also note that although photo eyes have been mentioned herein, other sensors of various types are also within the scope of the present invention for use in tracking the primals. In particular, substantially any low cost appropriate sensor may be used to detect the hams.

Eventually, hams are provided to an in-motion scale 60 (FIG. 1) that weighs each ham as it traverses the scale, wherein the scale is substantially integrated with the conveyor 224 so that each ham is weighed while traveling across the scale at approximately the same rate as when being moved on the conveyor. Note that the in-motion scale 60 provides weight information regarding each ham to the computer 10 so that the weight of each ham may be identified with other characteristics of the ham and the carcass from which the ham was obtained. Further note that the in-motion scale 60 is a novel aspect of the present invention since it provides enhanced accuracy over other scales. In particular, the in-motion scale 60 has at least two weight sensors for substantially simultaneously measuring the weight of the ham. In particular, there is one weight sensor substantially near the end of the scale where each ham enters the weight detecting area and one weight sensor substantially near the portion of the weight sensing area where the hams exit. Accordingly, the ham in-motion scale 60 processes and combines the signals from each weight detector for determining a more accurate weight of each ham. In particular, each weight sensor provides approximately 250 weight measurements as a ham crosses the in-motion scale. Thus, by combining the signals (such as by digital signal processing techniques), any oscillations in the weight of the ham due to the ham traversing the weighing area may be reduced. In particular, since each weight sensor is sampled concurrently, there is a sample sequence of 250 samples for each weight sensor wherein each sample from one of the sensors corresponds, in time, to a corresponding sample from the other sensor. Accordingly, by adding corresponding samples, a third sequence of 250 values is obtained. Additionally, by subtracting corresponding samples a fourth sequence of 250 values is obtained. Furthermore, time derivatives of each of the third and fourth sequences can be also obtained. Thus, by analyzing the third, fourth and derivative sequences, determinations can be made as to when a ham is within an area of the in-motion scale that allows for reliable and accurate weight measurements to be determined.

Following the in-motion scale 60, in one embodiment as represented in FIG. 1, of the present invention, a determination is made by the computer 10 as to whether, for example, the ham is to be sold as a commodity (i.e., as a whole ham), or sliced or cut into smaller primals. Note that it is typical for lower grade hams to be sold as a commodity. Thus, the computer 10 may use current prices for various cuts of ham along with information obtained from, for example, the vision system 52 and the in-motion scale 60 for determining the subsequent processing of each ham. Accordingly, the computer 10 via the network 20 directs the sortation output device 64 to at least cause a primal sorting device 66 to identify each ham for subsequent processing. That is, since the computer 10 has received information along the path 28 from various sensors and ham analysis devices, the computer 10 is able to track each ham and thereby identify each ham at the sortation output device 64 so that sorting of the hams can be performed. Note that a high level flowchart for the processing performed by the computer 10 in tracking the hams along the path 28 is presented in FIG. 3 and described hereinbelow.

After the hams are sorted, the hams may be conveyed to various sites depending on the category into which they are sorted. However, for each conveyor and/or ham chute for conveying hams from the primal sorting device 66, there are further low-cost sensors provided along the conveyor belts or chutes receiving hams from the primal sorting device 66. Note that these sensors may be also low-cost photo eyes substantially similar to the tracking sensors described in the boxes labeled 44 and 56. Subsequently, once each ham has been appropriately trimmed of excess fat, each ham is provided to a grading scale 72 for final grading of the hams or ham products prior to packaging.

Figure 3A:
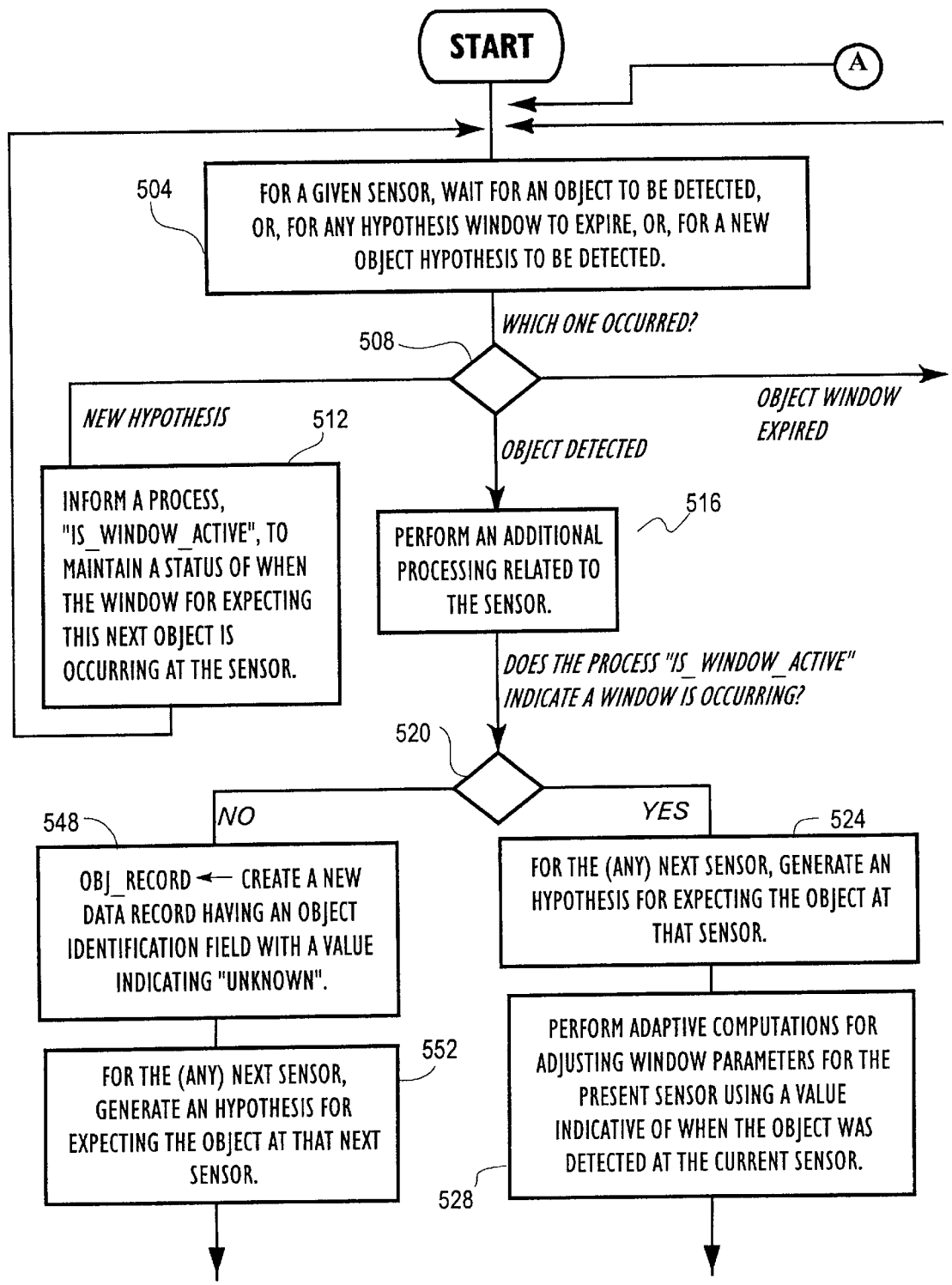
FIGS. 3A–C are a high level flowchart of the steps performed when tracking objects such as primals along various conveyors of a processing plant.
Figure 3B:
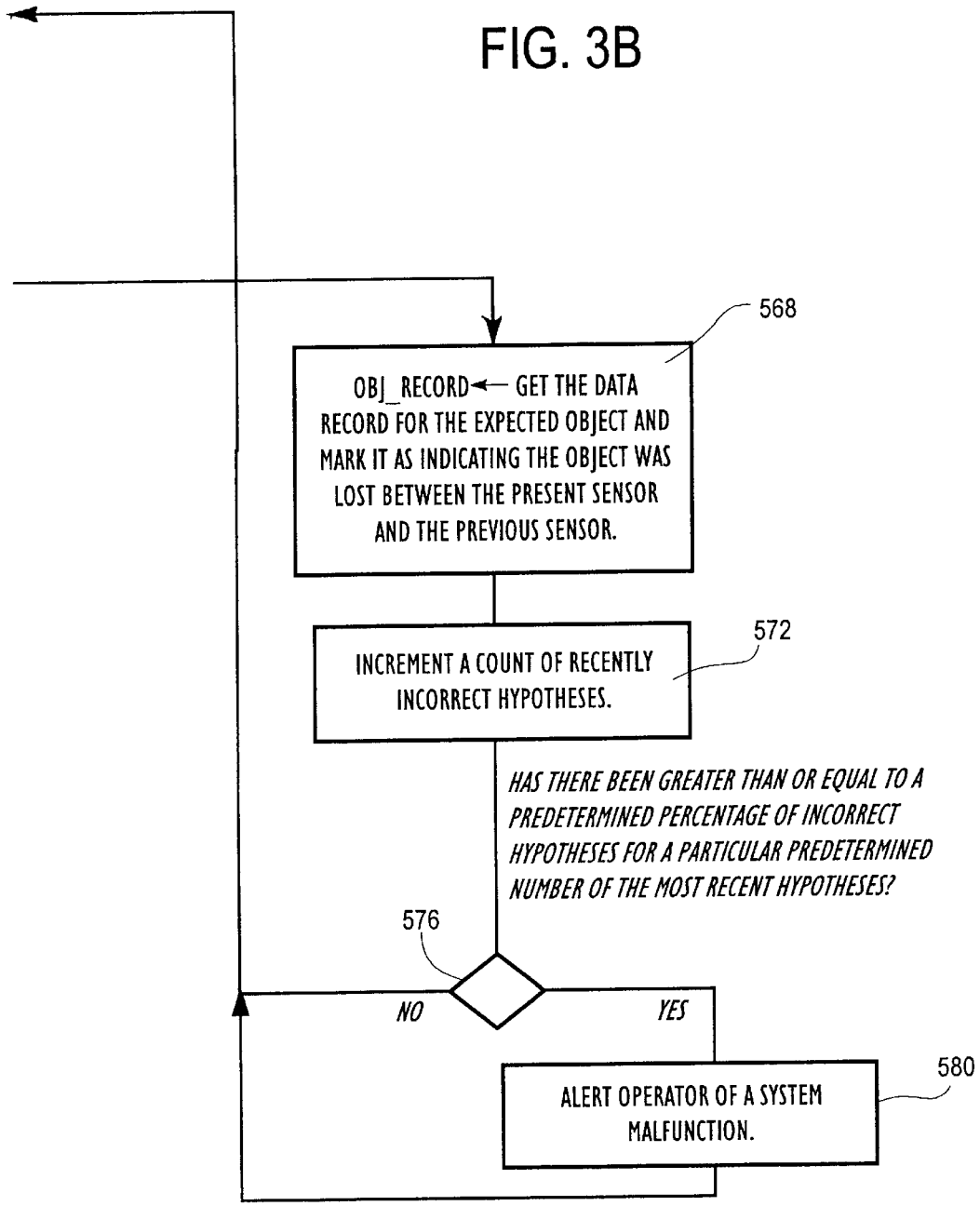
Figure 3C:
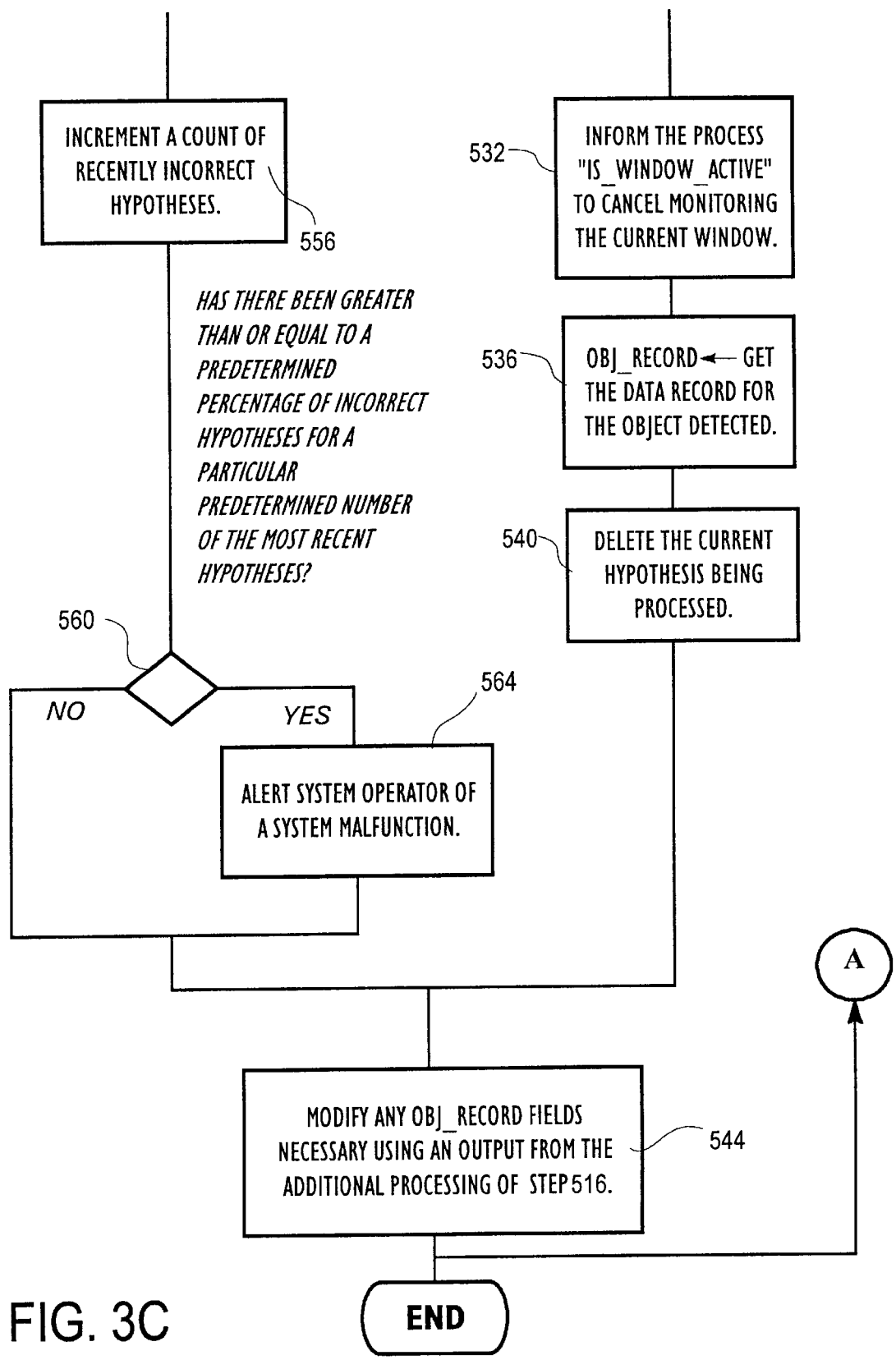

In FIG. 3, a flowchart, according to the present invention, is presented of the steps performed in detecting objects such as meat on a conveyor belt. In particular, the processing performed by this flowchart does not assume that the objects are tagged or identified in any unique way. That is, the objects tracked by the program of this flowchart may be tracked using very simple sensors (e.g., photo eyes) that effectively only give a binary reading of, for example, an object being detected or an object not being detected. Of course, sensors providing a greater amount of data can be used as well. The additional data may be used for categorizing or characterizing the object. For example, in a meat processing context, such additional data may be from a photo sensor for use in determining the fat to lean ratio or the marbling of the meat or the size or shape of the meat. Thus, when tracking meat primals, various types of sensors may be distributed along the meat conveyors that convey the primals through a meat cutting and packaging process. The sensors are, in one embodiment, provided approximately every 10 to 20 feet along each conveyor. Further, additional sensors, also referred to herein as encoders, can be used to detect and tally incremental movements of the conveyors. For example, such an encoder can be used to monitor and tally the rotational angular change of a belt pulley along a conveyor and thereby detect the movement of the conveyor belt and accordingly, the objects thereon. Additionally, it is important to note that the flowchart of FIG. 3 provides a mechanism for following an object along a path having sensors wherein the input from each sensor regarding the detection of an object along the path causes the program to generate an hypothesis of when the object detected is expected to be detected at any next sensor along the path. More particularly, in at least one embodiment for tracking primals, such hypotheses for expected detections at a next sensor can be provided by a range of values (hereinafter also referred to as a window) wherein the values are units of angular rotational change of a conveyor pulley as detected by an encoder as described above. Thus, each such hypothesis for tracking a primal includes a window of angular rotational units (also hereinafter referred to as "counts"). Thus, for a given "present sensor," if a primal has been detected within each window for the hypothesis each previous sensor, then the hypothesis generated for the present sensor is intended to provide access to, or identification of, a data record for the primal that includes all information thus far gathered on the primal. For instance, such information may include various characteristics of the primal and tracking data related to the identity of the carcass from which the primal was obtained and the lot of animals as well as the grower. Further, if some of these previous sensors provide further information regarding the primal, or larger cuts of meat from which the primal was derived, then the analysis of such information can also be provided in the data record for the primal. That is, if some of the previous sensors included vision color sensors, weight sensors (such as in-motion scales that are substantially integrated with the conveyor belt) and/or other imaging technologies such as sonar, infrared, microwave or x-ray, then the results of such sensors may also be associated with the primal being tracked. Note that other techniques for determining when a primal is expected to be detected at a given sensor are also within the scope of the present invention. In particular, such determination may be dependent upon one of the following:

(a) an (expected) rate of movement between sensors;

(b) an (expected) elapsed time interval between sensors; and (c) a distance between sensors.

Accordingly, the flowchart of FIG. 3 is performed for each sensor along each path that an object such as a primal is expected to traverse. Thus, describing the flowchart in more detail, in step 504, for a given sensor, this step waits for one of the following events to be detected: (a) an object to be detected by the sensor; or (b) an indication of the expiration of an hypothesis window, wherein the window provides the expected range of values as to when to expect the next object; or (c) a new object hypothesis has been generated for the present sensor for indicating when a next object is to be detected by the present sensor. Accordingly, in step 508, a determination is made as to which one of the above events has occurred. If a new hypothesis is detected for the present sensor, then step 512 is performed wherein a cooperating process hereinafter denoted as "IS_WINDOW_ACTIVE" is provided with information related to the window associated with the new hypothesis so that this cooperating process can be used for determining when the window of this new hypothesis is active and when it expires. Subsequently, the flow of control for the present flowchart returns to step 504 and awaits the detection of another event.

Referring again to step 508, if it is determined that an object is detected by the present sensor, then step 516 is performed wherein any additional processing related to the present sensor is activated. That is, if the sensor is more than just an object detection sensor (e.g., a sensor for color detection, weight detection, size detection, and/or bone detection, etc.), then the additional information is generated in this step and the results are conveyed (via network 20) to computer 10 so that this information can be stored in an appropriate data record as described in steps hereinbelow. Subsequently, in step 520, a determination is made as to whether the cooperating process "IS_WINDOW_ACTIVE" indicates that an hypothesis window is currently occurring for the object that has been detected. If the result of this step is affirmative, then step 524 is performed wherein for any next sensor along the current processing path for the object, a new hypothesis is generated providing a window of when the object is to be expected at the next sensor, and additionally the new hypothesis provides access to or identifies any data record that is associated with the object being detected by the present sensor. Following step 524, step 528 is performed wherein hypothesis window parameters are adaptively changed according to when the most recent objects have been detected within their corresponding windows at the present sensor. Note that there are numerous techniques for doing such adaptation. Further, windows may be shifted as to when they occur or their sizes may be varied. In one embodiment, windows are shifted according to an exponential decay technique based on a weighting scheme wherein, for example, the midpoint of the next hypothesis window to be generated for the present sensor is determined by averaging the number of counts measured between the detections at the present sensor and an immediately previous sensor using each of 1,000 of the immediately preceding objects that were detected within their corresponding windows at the present sensor. Additionally, a similar measurement is made for the present object so that a measurement is taken of the number of counts before the present object was detected. Subsequently, a weighted sum is provided for obtaining a midpoint of the next window for the next object to be detected by the present sensor. In particular, such weighting may be 0.9 times the average for the previous thousand objects and 0.1 times the measurement for the present object. Thus, if subtle but consistent changes occur in the positioning of the objects (e.g., primals) on a conveyor, then the hypothesis windows can shift and adapt according to such changes. Note that such adaptivity can be important in meat packaging and processing in that, for example, different meat processing personnel may move or relocate primals on the conveyor belt differently. Accordingly, the present invention can adapt to such changes.

In step 532, the cooperating process, "IS_WINDOW_ACTIVE" is informed that the monitoring of the current window for the current sensor should be canceled. Subsequently, in step 536, the variable, OBJ_RECORD, is assigned the data record for the object currently being detected at the sensor. Subsequently, in step 540, the current hypothesis can now be deleted since the object corresponding to the hypothesis has been detected. Subsequently, in step 544, the data record assigned to the variable, OBJ_RECORD, has any data fields modified and/or added that are necessary to retain any additional information obtained in step 516 related to the hypothesis detected in step 540. Following step 544, the flow of control returns to step 504 to wait for the detection of another event.

Returning to step 520, if the cooperating process "IS_WINDOW_ACTIVE" indicates that there is no window occurring at the present time for the present sensor, then presumably the object detected is unknown. Accordingly, the steps on the negative branch from step 520 are performed. Thus, in step 548, the variable, OBJ_RECORD, is assigned a new data record having an object identification field with a value of "unknown." Subsequently, in step 552, an hypothesis is generated for expecting this unknown object at the (any) sensor following the present sensor. Further, a count of recently incorrect hypotheses is incremented. Note that this step and the following steps through step 564 provide for the detection of short-term but potentially persistent anomalous events in that these steps are used to detect a substantial number of incorrect hypotheses within a relatively short period of time. Thus, in step 560, a determination is made as to whether there has been greater than or equal to a predetermined percentage of incorrect hypotheses for a particular predetermined number of the most recent hypotheses. In one embodiment of the flowchart, wherein primals are tracked, it has been found that if 8 out of 10, or 80% of a predetermined number of the most recent hypotheses for the present sensor have been incorrect, then there is a high likelihood of either personnel error or equipment malfunction. Accordingly, if this is the case, then in step 564, an operator is alerted to a system malfunction. Subsequently, step 544 is again performed, wherein the newly created data record, OBJ_RECORD, is modified with any additional information also obtained from step 516. Following this step, as before, the flow of control loops back to step 504 to await the detection of the next event.

Returning once again to step 508, if the event detected is the expiration of a window, then, in step 568, the variable, OBJ_RECORD, is assigned the data record for the object that was expected to be detected within the window and mark this data record as indicating that the object has been lost between the present sensor and the previous sensor. Subsequently, in steps 572 through 580, a determination is made as to whether there has been an excessive number of incorrect hypotheses within the recent past. These steps are identical to the steps 556 through 564. Then, after step 580, the flow of control for the present flowchart again loops back to step 504 and waits for the next event to be detected.

The foregoing discussion of the present invention has been presented for the purposes of illustration and description. Further the description is not intended to limit the invention to the form disclosed herein. Consequently, variation and modification commensurate with the above teachings, within the skill and knowledge of the relevant art, are within the scope of the present invention. The embodiment described herein above is further intended to explain the best mode presently known of practicing the invention and to enable others skilled in the art to utilize the invention as such or in other embodiments, and with the various modifications required by their particular application or uses of the invention.

What is claimed is:

1. A device for the tracking of primal meat products within a meat processing plant that has a killing floor and a cutting floor, comprising:

a tracking system that collects data from both a killing floor and a cutting floor in a meat processing plant such that data collected from said killing floor and said cutting floor is combined for each individual primal meat product, said data consisting of information selected from the group consisting of:
(a) hot scale weight average (by lot) and/or (by shift);
(b) hog evaluation average (by lot) and/or (by shift);
(c) average percent of lean meat per carcass (by lot) and/or (by shift);
(c) number of hogs processed per shift;
(e) number of records with missing weights per shift;
(f) cold scale average weight (by lot) and/or (by shift);
(g) average percent of carcass shrinkage (by lot) and/or (by shift);
(h) estimated percent lean meat per carcass using a fat measuring device on the killing floor;
(i) average hams per lot and per shift;
(j) average shoulders per lot and per shift;
(k) average ribs per lot and per shift;
(l) average loins per lot and per shift, and
(m) average bellies per lot and per shift;

said tracking system comprising means for storing said data, said storing means able to associate a particular primal meat product with said data throughout the processing of said primal meat product, said primal meat product, when conveyed through said tracking system, requiring no physical manipulation by a human being.

2. A method for tracking primal meat products, comprising providing the primal meat product to a conveyor for transporting said primal meat product from a first location to a second location;

first sensing one or more measurements of said product with a first sensor while the food product is in motion, said motion induced at least in part by said conveyor;

second sensing one or more measurements of said product with a second sensor while said product is in motion;

combining the one or more measurements of the first step of sensing with one or more measurements of said second step of sensing for obtaining a combination measurement of said product, said measurements selected from the group consisting of;

a color value; a marbling score; a yield prediction value, a weight; a carcass identification; a measurement related to fat content; a rate of movement; an elapsed time interval; a distance between said first step of sensing and said second step of sensing; and a measurement related to a movement of said conveyor.

3. An apparatus for tracking primal meat products, comprising means for providing the primal meat product to a conveyor for transporting said primal meat product from a first location to a second location;

means for first sensing one or more measurements of said product with a first sensor while the food product is in motion, said motion induced at least in part by said conveyor;

means for second sensing one or more measurements of said product with a second sensor while said product is in motion;

means for combining the one or more measurements of the first step of sensing with one or more measurements of said second step of sensing for obtaining a combination measurement of said product, said measurements selected from the group consisting of;

a color value; a marbling score; a yield prediction value; a weight; a carcass identification; a measurement related to fat content; a rate of movement; an elapsed time interval; a distance between said first step of sensing and said second step of sensing and a measurement related to a movement of said conveyor.

* * * * *